UNITED STATES PATENT OFFICE.

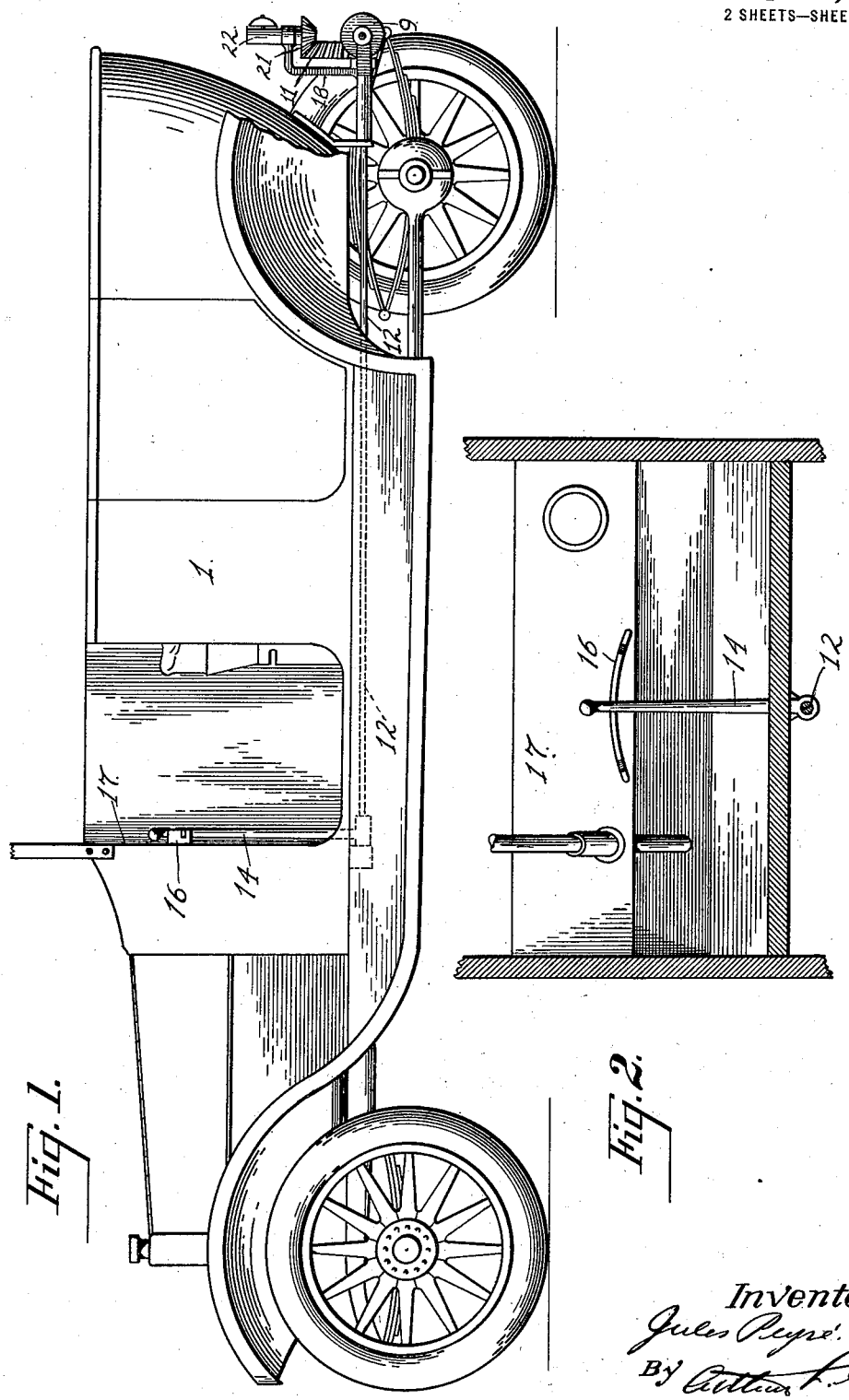

JULES PEYRÉ, OF SAN FRANCISCO, CALIFORNIA.

VEHICLE DIRECTION-INDICATOR.

1,390,381. Specification of Letters Patent. Patented Sept. 13, 1921.

Application filed August 29, 1919. Serial No. 321,242.

*To all whom it may concern:*

Be it known that I, JULES PEYRÉ, a citizen of the Republic of France, residing in the city and county of San Francisco and State of California, have invented a certain new and useful Improvement in a Vehicle Direction-Indicator, of which the following is a specification.

My invention relates to improvements in vehicle direction indicators and is an improvement of the device disclosed in Letters Patent of the United States, No. 1,288,669, issued to me on the 24th day of December, 1918, reference to which patent is hereby made.

The present invention consists in an improved and simplified construction of the device disclosed in the above mentioned patent wherein a single alarm is arranged to be operated simultaneously with either signal plate.

The primary object of the present invention is to provide improved means for displaying a conspicuous signal and simultaneously sounding an audible alarm to indicate the intentions of the operator of a preceding vehicle to following vehicles.

I accomplish these several objects by means of the improved means of the device disclosed in the drawings wherein like characters of reference are used to designate similar parts throughout the specification and drawings, and in which:

Figure 1 is a broken side elevation of a motor vehicle disclosing my improved direction indicator applied thereto;

Fig. 2 is an enlarged broken vertical sectional view disclosing the dash of a motor vehicle and the operating means for the indicator;

Figure 3:
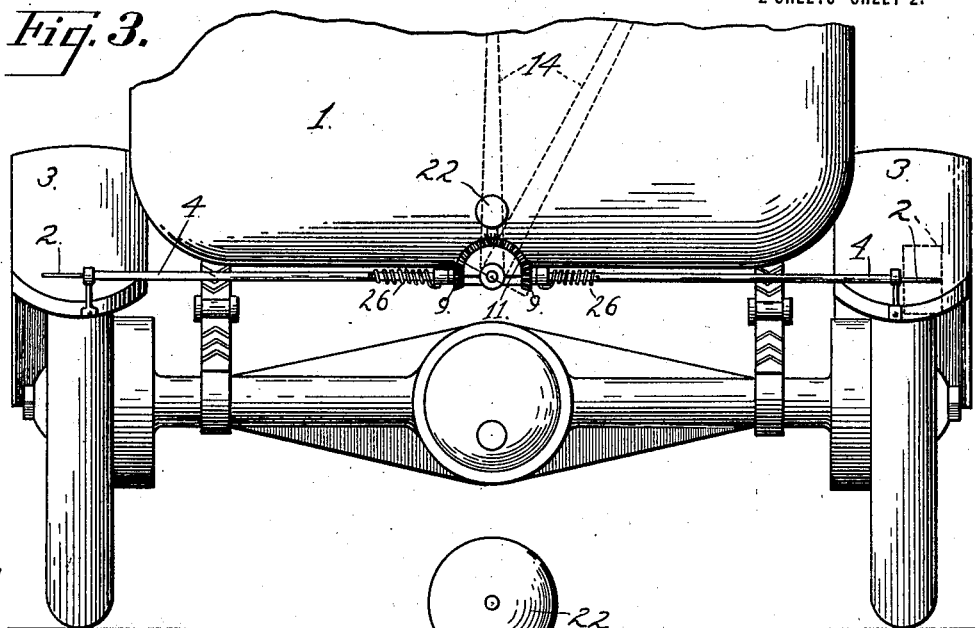
Fig. 3 is an enlarged broken rear end view of a motor vehicle disclosing a rear end elevation of the device.
Figure 4:
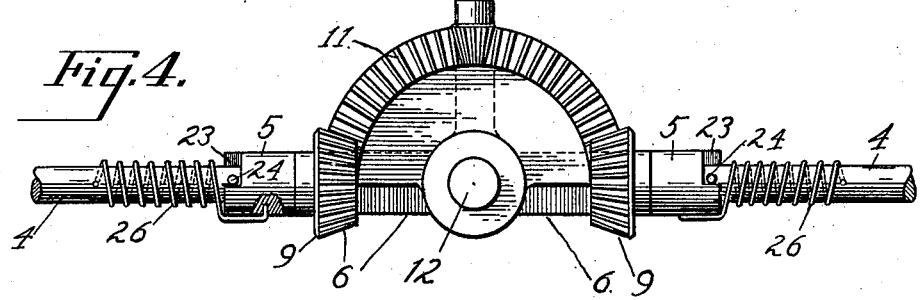
Fig. 4 is an enlarged broken detailed view of the signal engaging means.
Figure 5:
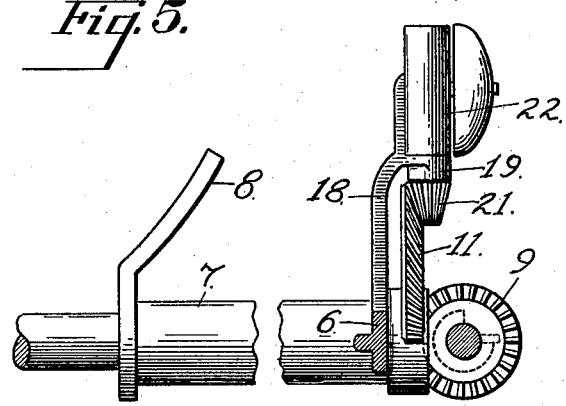
Fig. 5 is a broken side elevation, partly in section, of Fig. 4.

Referring to the drawings the numeral 1 is used to designate in general a motor vehicle having a signal plate 2 mounted upon each rear side of said vehicle and preferably on the rear fenders or mud guards 3 of the said vehicle 1.

Signal plate shafts 4 extend inwardly toward the center of the vehicle 1 and have said inner ends rotatably mounted within suitable bearings 5 on the arms 6 extending from a central bearing 7 provided with a bracket 8 by means of which said bearing may be secured to the rear end of the vehicle 1. The inner ends of the shafts 4 are each provided with a pinion 9 arranged to be engaged by a geared sector 11 mounted upon the rear end of a centrally disposed longitudinal shaft 12 rotatably mounted within the central bearing 7 and having its forward end provided with an upwardly extending lever 14 arranged to engage a notched sector 16 mounted upon the dash 17 of the vehicle 1.

A vertically disposed central arm 18 extending upwardly from the central bearing 7 is provided with a suitable bearing 19 within which is rotatably mounted a pinion 21 of smaller diameter than the pinions 9, said pinion 21 being constantly in mesh with the geared sector 11 and operatively connected to a suitable audible signal 22.

Each bearing 5 is provided with a notch 23 extending approximately one-quarter of the periphery of said bearing 5 within which notch rests a pin 24 on each shaft 4. A spring 26 is mounted upon each shaft 4 and adjacent the bearing 5 and has one end secured to said bearing and the other end secured to the shaft 4 and arranged to normally retain the pin 24 against one end of the notch 23 to retain the plate 2 in a horizontal or inconspicuous position as disclosed in Fig. 3 of the drawings.

In operation the lever 14 is operated to actuate the shaft 12 and partially rotate the same to the right or left according to the direction in which the vehicle is about to turn. The rotation of the shaft 12 will in turn rotate the geared sector 11 and engage the pinion 9 on that side only in which the vehicle is about to turn and rotate said pinion 9 and shaft 4 through a quarter revolution against the tension of the spring 26 until the pin 24 engages the opposite end of the notch 23 in the bearing 5 thereby moving the signal plate 2 on that shaft to a vertical and conspicuous position thereby indicating to a following vehicle that the preceding vehicle is about to turn in that direction.

It should be noted that when the sector 11 moves toward one pinion 9 it moves away from, and therefore does not operate the remaining pinion 9 and signal plate 2 attached thereto.

It should also be noted that when disengaged from the sector 11 the shaft 4 will be normally retained in a position to retain its respective signal plate 2 in a horizontal and inconspicuous position, by means of the spring 26 which will hold the pin 24 against the proper end of the notch 23 of the bearing 5 to retain said plate 2 in such inoperative position.

Having thus described my invention what I claim as new and desire to secure by Letters Patent is:

1. In a vehicle direction indicator, the combination with a signal plate pivotally mounted upon each rear side of a vehicle, of a shaft operatively connected to each of said signals and extending to the approximate center of the vehicle; pinions mounted upon the inner ends of said shafts; an operating shaft rotatably mounted upon the under side of said vehicle; means mounted in a position adjacent the operator of the vehicle for rotating said shaft in either direction; a segmental gear mounted upon rearward end of the operating shaft to engage the signal shaft pinions upon opposite extremities thereof in such manner that a rotation of the operating shaft in one direction from a normal position will rotate one signal into a displayed position, and rotation of the operating shaft in the other direction from said normal position will rotate the opposite signal into a displayed position.

2. In a vehicle direction indicator, the combination with a signal plate pivotally mounted upon each rear side of a vehicle of a shaft operatively connected to each of said signals and extending to the approximate center of the vehicle; pinions mounted upon the inner ends of said shafts; an operating shaft rotatably mounted upon the under side of said vehicle; means mounted in a position adjacent the operator of the vehicle for rotating said shaft in either direction; a segmental gear mounted upon rearward end of the operating shaft to engage the signal shaft pinions upon opposite extremities thereof in such manner that a rotation of the operating shaft in one direction from a normal position will rotate one signal into a displayed position, and rotation of the operating shaft in the other direction from said normal position will rotate the opposite signal into a displayed position; and an alarm geared to said segmental gear between the signal shaft pinions and arranged to be sounded when the operating gear is rotated in either direction.

3. In a vehicle direction indicator, the combination with a signal plate pivotally mounted upon each rear side of a vehicle, of a shaft operatively connected to each of said signals and extending to the approximate center of the vehicle; pinions mounted upon the inner ends of said shafts; an operating shaft rotatably mounted upon the under side of said vehicle; means mounted in a position adjacent the operator of the vehicle for rotating said shaft in either direction; a segmental gear mounted upon rearward end of the operating shaft to engage the signal shaft pinions upon opposite extremities thereof in such manner that a rotation of the operating shaft in one direction from a normal position will rotate one signal into a displayed position, and rotation of the operating shaft in the other direction from said normal position will rotate the opposite signal into a displayed position; an alarm geared to said segmental gear between the signal shaft pinions and arranged to be sounded when the operating gear is rotated in either direction; and means operatively connected to each signal shaft to normally retain the signal plates in a horizontal position.

4. In a vehicle direction indicator, the combination with a signal plate pivotally mounted upon each rear side of a vehicle, of a shaft operatively connected to each of said signals and extending to the approximate center of the vehicle; pinions mounted upon the inner ends of said shafts; an operating shaft rotatably mounted upon the under side of said vehicle; means mounted in a position adjacent the operator of the vehicle for rotating said shaft in either direction; a segmental gear mounted upon rearward end of the operating shaft to engage the signal shaft pinions upon opposite extremities thereof in such manner that a rotation of the operating shaft in one direction from a normal position will rotate one signal into a displayed position, and rotation of the operating shaft in the other direction from said normal position will rotate the opposite signal into a displayed position; an alarm geared to said segmental gear between the signal shaft pinions and arranged to be sounded when the operating gear is rotated in either direction; and means operatively connected to each signal shaft for normally retaining its respective plate in a horizontal position and for preventing more than a quarter revolution of said plates.

In witness whereof I hereunto set my signature.

JULES PEYRÉ.